(12) United States Patent
Farley

(10) Patent No.: US 11,192,134 B2
(45) Date of Patent: Dec. 7, 2021

(54) OFFSET SHOWERHEAD FILTER

(71) Applicant: David K. Farley, Corona, CA (US)

(72) Inventor: David K. Farley, Corona, CA (US)

(*) Notice: Subject to any disclaimer, the term of this patent is extended or adjusted under 35 U.S.C. 154(b) by 0 days.

(21) Appl. No.: 16/372,616

(22) Filed: Apr. 2, 2019

(65) Prior Publication Data

US 2020/0316632 A1 Oct. 8, 2020

(51) Int. Cl.
 *B05B 15/40* (2018.01)
 *B05B 1/18* (2006.01)
 *C02F 1/00* (2006.01)

(52) U.S. Cl.
 CPC ............. *B05B 15/40* (2018.02); *B05B 1/18* (2013.01)

(58) Field of Classification Search
 CPC .................................. B05B 15/40; B05B 1/18
 See application file for complete search history.

(56) References Cited

U.S. PATENT DOCUMENTS

| 4,654,142 | A |   | 3/1987 | Thomsen et al. |           |
|-----------|---|---|--------|----------------|-----------|
| 4,933,080 | A | * | 6/1990 | Rundzaitis     | B01D 35/043 |
|           |   |   |        |                | 210/232   |
| 5,022,986 | A |   | 6/1991 | Lang           |           |
| 5,213,688 | A | * | 5/1993 | Robinson       | B01D 29/114 |
|           |   |   |        |                | 210/440   |
| 5,876,600 | A | * | 3/1999 | Matsubara      | B01D 35/153 |
|           |   |   |        |                | 210/443   |
| 5,928,513 | A | * | 7/1999 | Bradford       | B01D 27/08 |
|           |   |   |        |                | 210/443   |
| 5,957,379 | A | * | 9/1999 | McMorrow       | B05B 7/2445 |
|           |   |   |        |                | 239/10    |
| 7,866,576 | B1 |   | 1/2011 | Farley         |           |
| 2003/0070968 | A1 | | 4/2003 | Haynes et al. |           |
| 2008/0011656 | A1 | | 1/2008 | Lacy et al.   |           |

FOREIGN PATENT DOCUMENTS

CN 104162304 A * 11/2014

* cited by examiner

*Primary Examiner* — Waqaas Ali
(74) *Attorney, Agent, or Firm* — Stetina Brunda Garred & Brucker

(57) ABSTRACT

A shower filter assembly includes a manifold having an external inlet and outlet, and internal inlet, and an internal inlet and outlet. The external outlet is fluidly connectable to the showerhead. An internal flowpath extends between the internal inlet and the external outlet. A manifold collar extends around the internal outlet and the internal inlet. A filter cartridge is engageable with the manifold, and includes a housing having a filter inlet and outlet. The filter inlet is placeable in fluid communication with the internal outlet on the manifold, and the filter outlet is placeable in fluid communication with the internal inlet on the manifold. The housing is sized to at least partially extend beyond the manifold collar when the housing is connected to the manifold. The filter cartridge has a flowpath from the filter inlet, through a filtration element, and then through the filter outlet.

19 Claims, 5 Drawing Sheets

OFFSET SHOWERHEAD FILTER

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to a shower filter and, more particularly, to a shower filter having a filter cartridge located outside of the showerhead and easily accessible for installation and replacement thereof.

2. Description of the Related Art

Shower filters of various types are well-known. Many shower filters are formed as cylindrical bodies having cylindrical filter cartridges formed therein. Such shower filters are typically connected at one end to a shower arm and at the other end to a showerhead. While such shower filters are effective in filtering impurities in the shower water, they may suffer from certain limitations. For example, the use of an in-line shower filter in combination with the separate showerhead tends to move the position of the showerhead further into the shower stall, to a position that may be less desirable. Additionally, in order to replace the filter cartridge in such an assembly, it may become necessary to disconnect the shower filter body from the shower arm and/or the shower filter, to allow the filter body to be opened in the cartridge to be removed and replaced.

More recently, the functionality of the shower filter in a showerhead have been combined in a single filtered showerhead, where the body of the showerhead may be sized and configured to contain a filter cartridge. Such filtered showerheads provide advantages, such as limiting the extension of the showerhead into the shower. However, such combined filtered showerhead is associated with certain limitations. For example, the filter cartridge may need to be customized in shape to be accommodated within the body, and typically require the filtered showerhead to be disassembled, and/or disconnected from the shower arm before the filter cartridge may be replaced. As such cartridges may be of a more customized shape, they may be more expensive, and more difficult to locate when they need to be replaced.

A further type of shower filter assembly is an offset shower filter, wherein the shower filter assembly is connected between the shower arm and a separable showerhead. However, rather than being oriented in the direction of the shower arm, the filter assembly is oriented in a vertical direction, which mitigates the extension of the showerhead into the shower stall. Typically, the vertically extending filter is disposed within a canister which needs to be disconnected from the manifold before the filter cartridge may be replaced.

In view of foregoing, it is desirable to have a shower filter assembly that that minimizes extension of the showerhead into the shower, while also being easily readily disconnected from a shower filter manifold without the need for disconnecting the shower filter manifold from either the shower arm or the showerhead. Various aspects of the present disclosure address this particular need, as will be discussed in more detail below.

BRIEF SUMMARY

In accordance with one embodiment of the present disclosure, there is provided a filter assembly for use with a showerhead. The filter assembly may include a manifold positionable between the showerhead and a fluid inlet conduit. The manifold may be engageable with a filter cartridge and may divert water through the filter cartridge before the water flows through the showerhead. The manifold may be configured such that when the filter cartridge is attached thereto, a portion of the filter cartridge may remain exposed to allow for easy removal and replacement of the filter cartridge.

According to one embodiment, the filter assembly includes a manifold having an external inlet, an internal inlet, and an internal outlet. The external inlet is fluidly connectable to the inlet conduit, and in fluid communication with the internal outlet. An external outlet is fluidly connectable to the showerhead, and an internal flowpath extends between the internal inlet and the external outlet. A manifold collar extends around the internal outlet and the internal inlet. The filter assembly further includes a filter cartridge selectively engageable with the manifold, with the filter cartridge including a housing having a filter inlet and a filter outlet. The housing is connectable with the manifold to place the filter inlet in fluid communication with the internal outlet on the manifold, and the filter outlet in fluid communication with the internal inlet on the manifold. The housing is sized to at least partially extend beyond the manifold collar when the housing is connected to the manifold. The filter cartridge additionally includes a filtration element located within the housing. The filter cartridge has a flowpath from the filter inlet, through the filtration element, and then through the filter outlet.

The manifold collar may include an inner surface defining a cavity within which at least a portion of the housing may be received when the filter cartridge is engaged with the manifold. The manifold may further include at least one tab extending into the cavity to facilitate engagement with the housing. The housing may include at least one groove formed therein, with the at least one groove being configured to receive the at least one tab to facilitate engagement between the housing and the manifold. The internal outlet may extend around a first axis, and the at least one tab and the at least one groove may be configured such that advancement of the at least one tab within the at least one groove causes the housing to rotate about the first axis. The least one tab and the at least one groove are configured such that advancement of the at least one tab within the at least one groove causes the housing to move axially along the first axis.

The manifold collar may include a terminal edge extending around the first axis and being non-parallel and non-perpendicular to the first axis.

The internal inlet may include an annular portion extending around the internal outlet.

The internal outlet may extend around a first axis and the second outlet may extend around a second axis in non-parallel relation to the first axis. The external inlet may extend around a third axis parallel to the first axis.

The external inlet may include internal threads to facilitate engagement with the inlet conduit. The external outlet may include external threads to facilitate engagement with the showerhead.

The filter assembly may additionally include a first seal coupled to the housing. The first seal may be engageable with the manifold when the housing is engaged with the manifold to create a water-tight connection between the internal outlet and the filter inlet. The filter assembly may further comprise a second seal coupled to the housing. The second seal may be engageable with the manifold when the housing is engaged with the manifold to create a water-tight connection between the filter outlet and the internal inlet.

According to another embodiment, there is provided a filter assembly for use with a water nozzle and an inlet conduit. The filter assembly comprises a manifold having a manifold inlet connectable to the inlet conduit to receive water therefrom, and a manifold outlet fluidly connectable to the water nozzle. The filter assembly further includes a filter cartridge selectively connectable to the manifold to facilitate fluid communication therebetween. The filter cartridge includes a filter inlet, a filter outlet, and a filtration element, with at least a portion of the filter cartridge being exposed when the filter cartridge is connected to the manifold. The manifold and filter cartridge collectively define a flowpath wherein water received from the inlet conduit flows sequentially through the manifold inlet, filter inlet, filtration element, filter outlet, and the manifold outlet.

The manifold may further include at least one tab and the filter may include at least one groove formed therein, with the at least one groove being configured to receive the at least one tab to facilitate engagement between the manifold and the filter.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Figure 1:
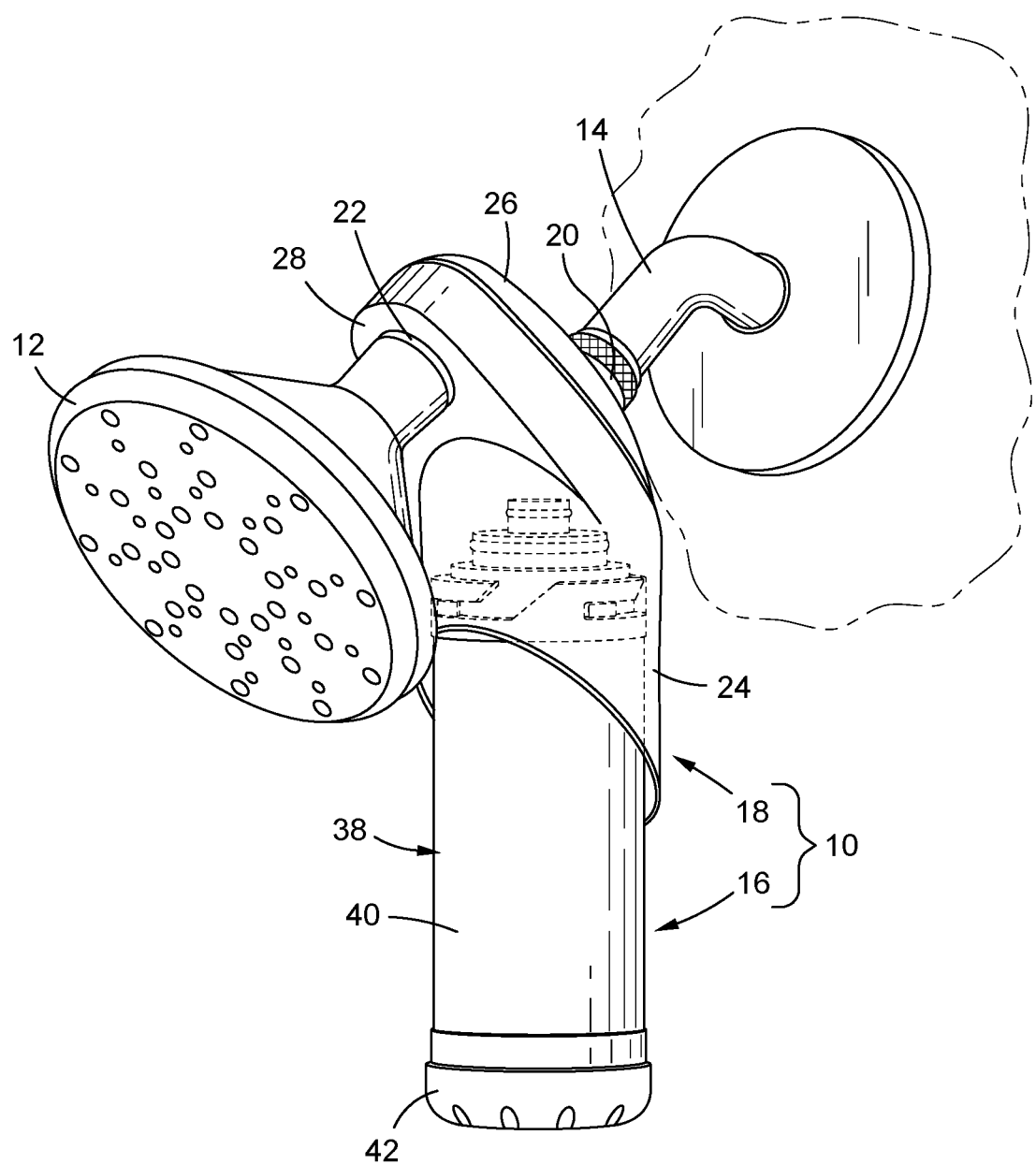
FIG. 1 is a lower perspective view of a shower filter assembly in accordance with the present disclosure, connected to a shower arm and a showerhead.

Referring now to the drawings, wherein the showings are for purposes of illustrating a preferred embodiment of the present disclosure only, and are not for purposes of limiting the same, there is depicted a filter assembly 10 for use with a showerhead 12 for filtering water upstream of the showerhead 12. The filter assembly 10 is configured to be attachable to a showerhead 12 and an inlet conduit 14 or shower arm to provide filtering capabilities to the showerhead 12, without requiring direct integration of a filter into the showerhead 12. The filter assembly 10 may generally include a filter cartridge 16 which is connectable to a manifold 18, with at least a portion of the filter cartridge 16 being exposed when attached to the manifold 18. Exposure of at least a portion of the filter cartridge 16 allows for quick and easy removal/installation and hence subsequent replacement of the filter cartridge 16.

Figure 2:
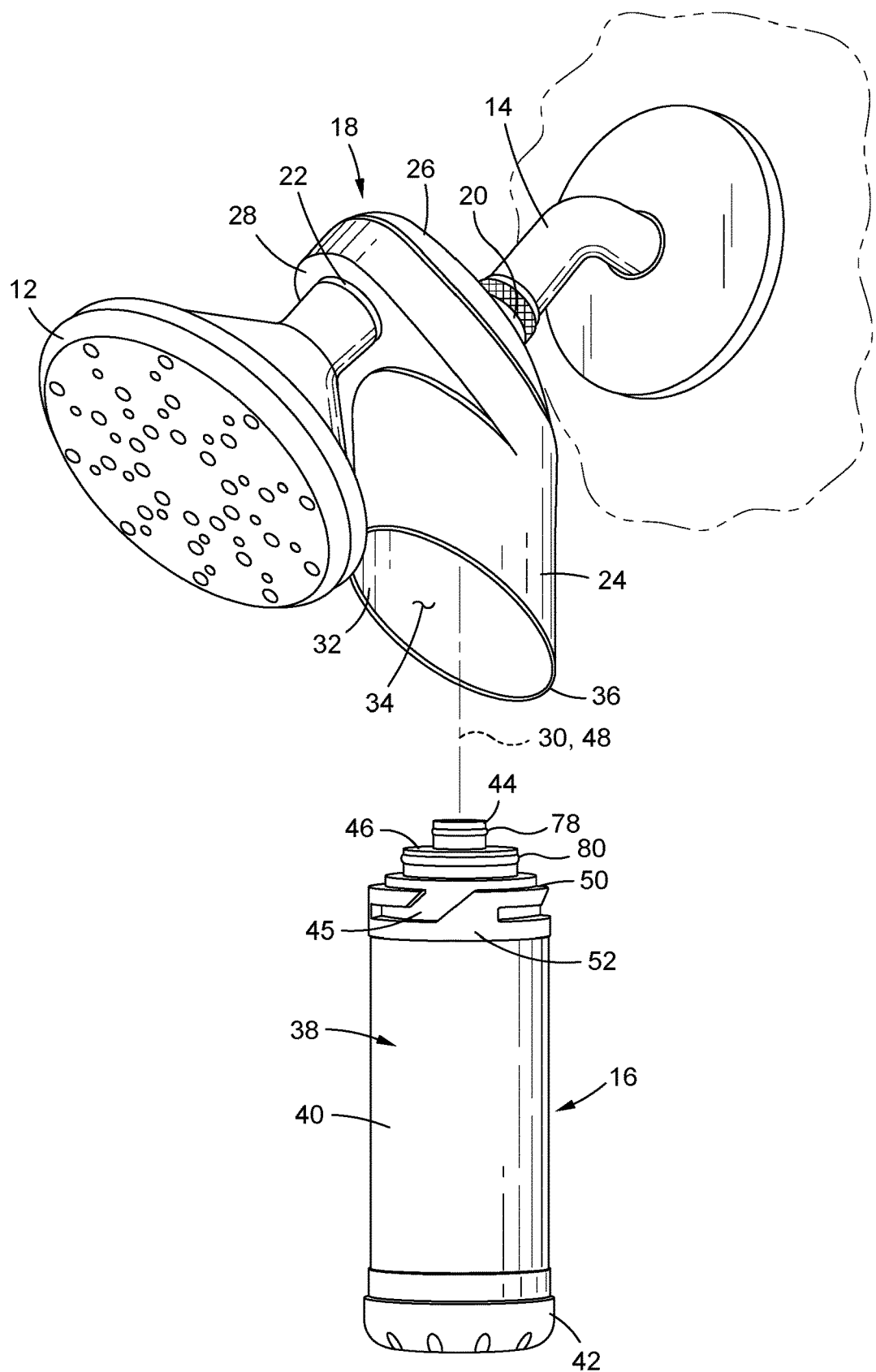
FIG. 2 is a lower perspective view of the shower filter assembly, with a filter cartridge of the assembly removed from a manifold also included in the assembly.

FIGS. 1 and 2 are perspective views of the filter assembly 10. The filter cartridge 16 is shown as being connected to the manifold 18 in FIG. 1, while FIG. 2 shows the filter cartridge 16 detached from the manifold 18. The manifold 18 includes an upper portion including a pair of external fluid connections, 20, 22 and a lower portion primarily comprised of a manifold collar 24. The pair of external fluid connections include an external inlet 20 protruding from a first surface 26 of the manifold 18 and fluidly connectable to the inlet conduit 14 (e.g., a shower arm) to receive water therefrom. An external outlet 22 protrudes from a second surface 28 of the manifold 18 and is fluidly connectable to the showerhead 12 to deliver filtered water to the showerhead 12.

The manifold collar 24 extends downwardly from the upper portion of the manifold 18 and around a collar axis 30. The manifold collar 24 includes an inner surface 32 defining a cavity 34 sized to receive at least a portion of the filter cartridge 16 when the filter cartridge 16 is engaged with the manifold 18. The manifold collar 24 may include a terminal edge 36 extending around the collar axis 30 and configured to be non-parallel and non-perpendicular to the collar axis 30. As can be seen in FIG. 1, a portion of the filter cartridge 16 is concealed by the manifold collar 24 when the filter cartridge 16 is engaged with the manifold 18. However, exposure of the lower portion of the filter cartridge 16 allows for easy access to the filter cartridge 16 to facilitate installation and replacement of the filter cartridge 16. In this regard, access to the filter cartridge 16 does not require detachment of the showerhead from the manifold 18, or detachment of the manifold 18 from the inlet conduit 14.

The filter cartridge 16 includes a housing 38 having a sidewall 40 and an end cap 42. The sidewall 40 includes an upper end portion and a lower end portion, with the upper end portion being specifically configured to mate with the manifold 18. The housing 38 may include an inlet collar defining a filter inlet 44, and an outlet shoulder defining a filter outlet 46. The filter inlet 44 and filter outlet 46 may be coaxially aligned about a filter axis 48 and may define a stepped configuration.

The filter cartridge 16 may include one or more grooves 45 formed in the sidewall 40 for connecting the filter cartridge 16 to the manifold 18, as will be described in more detail below. The sidewall 40 includes an upper edge 50 and an outer surface 52. Each groove 45 extends into the sidewall 40 from the outer surface 52 and includes both an axial component and a radial component, which results in the filter cartridge 16 requiring both axial and rotational movement relative to the manifold 18 to connect the filter cartridge 16 to the manifold 18. In this regard, the connection between the manifold 18 and the filter cartridge 16 may be a bayonet connection. In particular, each groove 45 includes an opening at the upper edge 50, and an angled segment, extending both axially and radially relative to the filter axis 48. The angled segment transitions into a radial segment extending radially relative to the filter axis 48 and partially along an outer periphery of the filter cartridge 16. The radial segment includes a closed end opposite the angled segment to define a stop associated with complete engagement between the filter cartridge 16 and the manifold 18.

Figure 3:
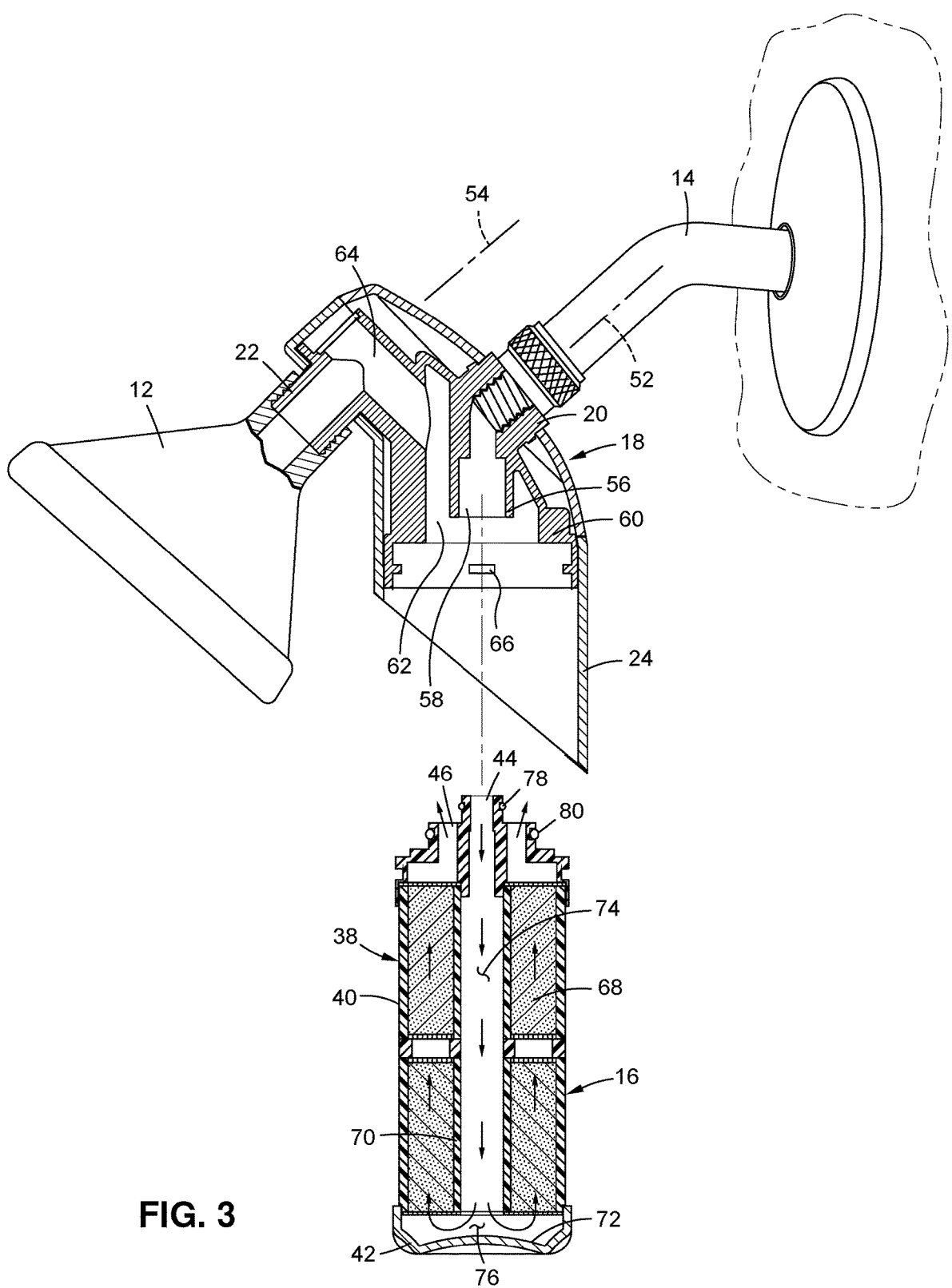
FIG. 3 is a sectional view of the shower filter assembly, with the filter cartridge removed from the manifold.
Figures 4, 5:
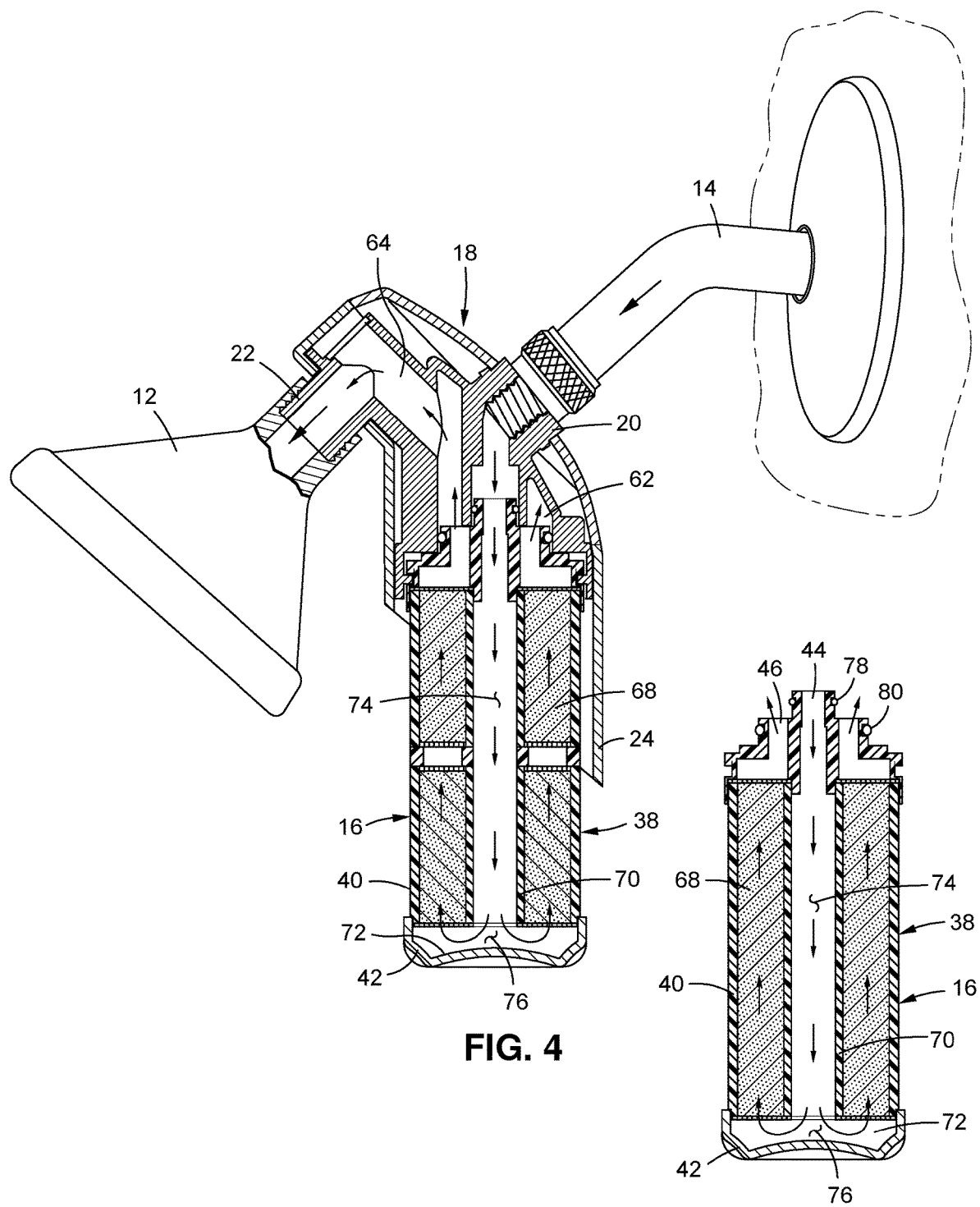
FIG. 4 is a sectional view of the shower filter assembly with the filter cartridge releasably engaged with the manifold.
FIG. 5 is a sectional view of the filter cartridge.

Referring now to FIGS. 3 and 4, which depict cross sections of the filter assembly 10, the internal structure of the manifold 18 and the filter cartridge 16 will be described below. In greater detail, the cross sections of the filter assembly 10 illustrate the interconnections between the manifold 18, the inlet conduit 14, and the showerhead 12, as well as the interconnection between the manifold 18 and the filter cartridge 16, which may be effectuated via an internal outlet 56 and an internal inlet 62 on the manifold 18.

The manifold 18 may be configured to be interconnected to the inlet conduit 14 and the showerhead 12 via threaded connections. Accordingly, the external inlet 20 may be internally threaded to engage with corresponding external threads on the inlet conduit 14, while the external outlet 22 may be externally threaded to facilitate connection with a corresponding internally threaded portion of the showerhead 12. From the perspective shown in FIGS. 3 and 4, the external inlet 20 may be disposed about an inlet axis 52, and the external outlet 22 may be disposed about an outlet axis 54. In one embodiment, the inlet and outlet axes 52, 54 are substantially parallel to each other, although it is understood that certain geometries of the showerhead, or desired angle of water discharge may result in other angular arrangements of the inlet and outlet axes 52, 54.

The internal outlet 56 of the manifold 18 is defined by an internal cylindrical wall 58 disposed about the collar axis 30. The internal cylindrical wall 58 extends from the inlet collar and includes a stepped internal diameter. In particular, an upper portion of the cylindrical wall 58 is of a first diameter and a lower portion is of a second diameter greater than the first diameter. A shoulder may extend between the first diameter and the second diameter.

The manifold 18 may include an outer wall 60 defining a flowpath 64 between the internal inlet 62 and the external outlet 22. The flowpath 64 may include an annular portion that circumnavigates the lower portion of the cylindrical wall. The size of the flowpath 64 may decrease from the internal inlet 62 toward the external outlet 22, which may result in a desirable pressure increase of water flowing therethrough.

The manifold 18 may further include at least one tab 66 (and preferably several tabs 66) to facilitate engagement with the housing 38 of the filter cartridge 16. The tabs 66 may extend into the cavity 34 and in a spaced, circumferential arrangement relative to each other and the collar axis 30. The tabs 66 may be configured to interface with the grooves 45 formed on the filter cartridge 16 to engage the manifold 18 to the filter cartridge 16.

Referring now to the internal structure of the filter cartridge 16, an exemplary embodiment of which is depicted in FIGS. 3-5, the filter cartridge 16 may include a filtration element 68 located within the housing 38. The filtration element 68 may be formed from carbon or other filtration materials known in the art. The filtration element 68 may be annular and define an inner diameter and outer diameter. The filter cartridge 16 depicted in FIGS. 1-8 includes a pair of filtration elements 68 in a spaced, stacked arrangement. Along these lines, it is understood that the filter cartridge 16 may include any number of filtration elements 68 without departing from the spirit and scope of the present disclosure.

An inner wall 70 may extend along the inner diameter of the filtration element 68, and the housing 38 may extend along the outer diameter of the filtration element 68. The bottom of the housing 38 may include an arcuate surface 72 to promote desired flow characteristics.

The filter cartridge 16 may include an internal flowpath having an inlet segment 74 extending from the filter inlet 44 and along the inner wall 70. The flowpath may continue to a diversion segment 76, wherein water may impinge on the arcuate surface 72 and be diverted in a radially outward direction. The flowpath may further continue through the filtration element(s) 68, and then through the filter outlet 46. The water exiting the filter cartridge 16 may enter the internal inlet of the manifold 18, as will be described in more detail below.

The filter cartridge 16 may include one or more seals to create fluid-tight engagement between the filter cartridge 16 and the manifold 18. A first seal 78 may be coupled to the housing 38 and configured to be engageable with the manifold 18 when the housing 38 is engaged with the manifold 18 to create a water-tight connection between the internal outlet 56 and the filter inlet 44. The filter cartridge 16 may further comprise a second seal 80 coupled to the housing 38. The second seal 80 may be engageable with the manifold 18 when the housing 38 is engaged with the manifold 18 to create a water-tight connection between the filter outlet and the internal inlet.

Figure 6:
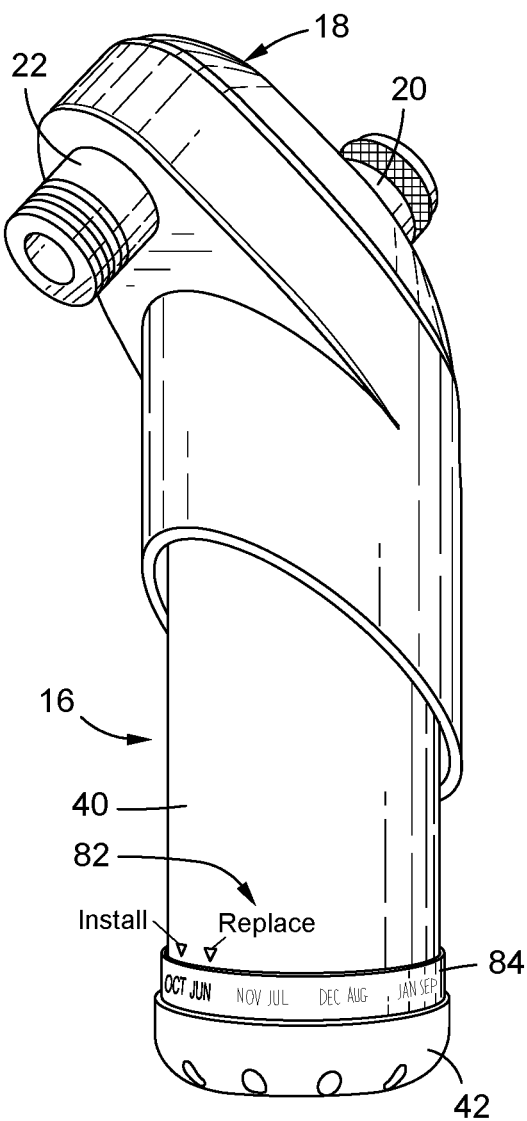
FIG. 6 is a lower perspective view of the shower filter assembly.
Figure 7:
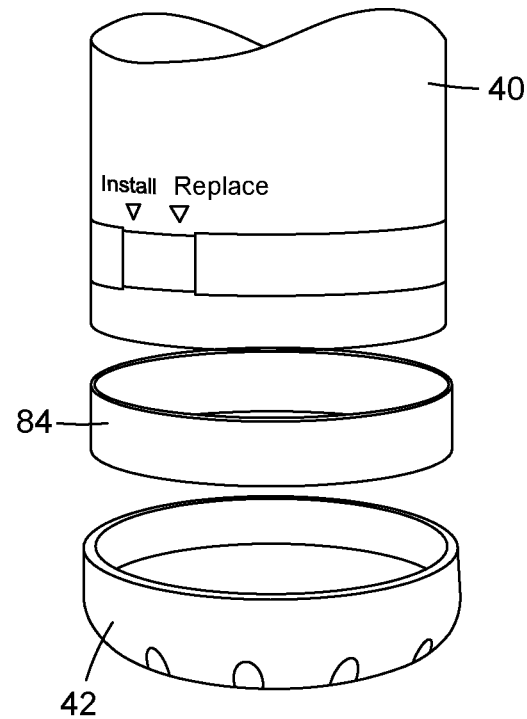
FIG. 7 is an exploded perspective view of an adjustable install/replace indicator mechanism on the filter cartridge.
Figure 8:
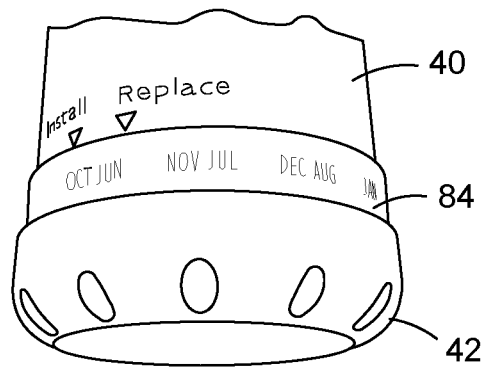
FIG. 8 is partial lower perspective view of the filter cartridge depicting the install/replace indicator mechanism assembled onto the cartridge filter cartridge.

Referring now specifically to FIGS. 6-8, the filter cartridge 16 may include an adjustable install/replace indicator mechanism 82 to provide a visual indicator as to when the filter cartridge was installed, and an estimate as to when the filter cartridge 16 may require replacement based on an average usage rate. The indicator mechanism 82 may include indicia printed on the housing 38, particularly the words "Install" and "Replace" above respective downwardly pointing triangles or arrows. The triangles or arrows may be separated from each other by a first distance. A band 84 may be sized to extend around, and frictionally engage the outer surface of the housing 38. The band 84 may include a plurality of paired months depicted around the outer circumference of the band 84. In the exemplary embodiment, the months the are paired together are seven months apart, and thus, the expected average lifetime of the filtration element may be seven months. For instance, October is paired with June, November is paired with July, and so forth. The band 84 may be selectively positioned, e.g., rotated, relative to the indicia on the housing 38, such that the month the filtration element 68 is installed is positioned under the "Install" arrow. Such placement will automatically align the corresponding month under the "Replace" arrow. Thus, in the example depicted in FIGS. 6 and 8, the filtration element 68 having been installed in October will require replacement approximately in June. The end cap 42 may be connected to the sidewall 40 of the housing 38 to enclose the filter cartridge 16 and to keep the band 84 in place.

The indicator mechanism 82 provides a rough approximate as to when the filer cartridge 16 may require replacement. An abnormally high amount of usage after installation may require replacement sooner than what is indicated on the filter cartridge 16, and vice versa.

It is contemplated that in lieu of the entire filter cartridge 16 being sacrificial, only the expired filtration element(s) 68 may require periodic replacement. In greater detail, in a contemplated version of the filter cartridge 16, one or more new filtration elements 68 may substituted for the expired filtration element(s) 68 by removing the end cap 42 and inserting the new filtration element(s) 68 into the housing 38 after the removal of the old filtration element(s) 68 therefrom. Upon replacement of the entire filter cartridge 16 or only its filtration element(s) 68, the indicator band 84 may be selectively manipulated such that the current month is positioned under the "Install" arrow.

With the basic structure of the filter assembly 10 described above, the following discussion relates to an exemplary use of the filter assembly 10. The filter assembly 10 may be installed by attaching the manifold 18 to the inlet conduit 14 and the showerhead 12. In particular, the external inlet 20 is connected to the inlet conduit 14 and the external outlet 22 is connected to the showerhead 12.

The filter cartridge 16 may then be installed on the manifold 18 by arranging the filter cartridge 16 with the filter inlet 44 extending toward the manifold collar 24, and then inserting the filter cartridge 16 into the manifold collar 24. The filter cartridge 16 is continuously advanced until the upper edge 50 of the housing sidewall 40 abuts the tabs 66 or the top of the filter inlet 44 abuts the internal cylindrical wall 58. The filter cartridge 16 is then rotated while also being urged further into the manifold collar 24, which causes respective tabs 66 on the manifold 18 to be received into respective grooves 45 on the filter cartridge 16. The configuration of the grooves 45 causes the filter cartridge 16 to move axially and rotationally as the tabs 66 advance through the respective grooves 45. When the tabs 66 abut the end of each groove 45, the filter cartridge 16 is completely engaged with the manifold 18. In this position, the first seal 78 engages with an inner surface of the internal cylindrical wall 58 to create a fluid tight seal between the filter inlet 44 and the internal cylindrical wall 58, and the second seal 80 engages with the inner surface of the outer wall 60 to create a fluid tight seal therebetween. When the filter cartridge 16 is engaged with the manifold 18, the lower portion of the filter cartridge 16 extends beyond the terminal edge 36 of the manifold collar 24.

Importantly, whereas many currently know "tabbed cartridges" have top tabs, the filter cartridge 16 is unique in that its integration into the manifold 18 essentially happens in reverse, i.e., the tabs 66 within the interior of the manifold 18 engage the lock grooves 45 within the exterior of the filter cartridge 16 which makes the interconnection even stronger with the tabs 66 being operative to reinforce the lock when the filter cartridge 16 is under pressure. In this regard, when the filter cartridge 16 is under pressure, it tends to expand which would otherwise typically create stress against a top-tab configuration. But with the tabs 66 formed on the manifold 18 at the outer diameter of the filter cartridge 16, the pressure expansion with the tabs 66 received into the grooves 45 actually reinforces the locking mechanism to ensure a safe and reliable hold.

When the shower is turned on, water is received at the external inlet 20 from the inlet conduit 14. The water then flows from the inlet conduit 14 and downwardly though the internal cylindrical wall 58 and exits the manifold 18 at the internal outlet 56. The water is then received by the filter inlet 44 of the filter cartridge 16, and then the water flows through the inlet segment 74 of the filter cartridge 16, through the diversion segment 76, and then upwardly through the filtration elements 68. The pressure of the water allows the water to flow upwardly through the filtration element 68. As the water flows through the filtration element 68, particulate and undesirable contents within the water may be captured in the filtration element 68. The filtered water then flows through the filter outlet 46, and into the internal inlet 62 of the manifold 18. The water continues through the manifold 18, and then exits the manifold 18 through the external outlet 22, where the filtered water is received by the showerhead 12. The water then flows through the showerhead 12, according to the prescribed flow pattern of the showerhead 12.

Although the foregoing description and related illustrations show a filter cartridge 16 having a bayonet-type connection with the manifold 18, it is understood that other types of connection, e.g., frictional press-fit connections, threaded connections, etc., may be employed without departing from the spirit and scope of the present disclosure.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A filter assembly for a showerhead and an inlet conduit, the filter assembly comprising:
    a manifold having:
        an external inlet fluidly connectable to the inlet conduit and extending about an inlet axis defined by the inlet conduit;
        an internal outlet in fluid communication with the external inlet and extending about a collar axis which is angularly offset from and thus non- parallel to the inlet axis;
        an internal inlet having at least a portion extending about the collar axis;
        an external outlet fluidly connectable to the showerhead and defining an outlet axis;
        an internal flowpath extending between the internal inlet and the external outlet; and
        a manifold collar defining the collar axis and extending around the internal outlet and the internal inlet; and
    a filter cartridge selectively engageable with the manifold, the filter cartridge having:
        a housing having a filter inlet and a filter outlet, the housing being connectable with the manifold to place the filter inlet in fluid communication with the internal outlet on the manifold, and the filter outlet in fluid communication with the internal inlet on the manifold, the housing being sized to at least partially extend beyond the manifold collar when the housing is connected to the manifold; and
        a filtration element located within the housing;
        the filter cartridge having a flowpath from the filter inlet, through the filtration element, and then through the filter outlet.

2. The filter assembly recited in claim 1, wherein the manifold collar includes an inner surface defining a cavity within which at least a portion of the housing is received when the filter cartridge is engaged with the manifold, the manifold further including at least one tab extending into the cavity to facilitate engagement with the housing.

3. The filter assembly recited in claim 2, wherein the housing includes at least one groove formed therein, the at least one groove being configured to receive the at least one tab to facilitate engagement between the housing and the manifold.

4. The filter assembly recited in claim 3, wherein the at least one tab and the at least one groove are configured such that advancement of the at least one tab within the at least one groove causes the housing to rotate about the collar axis.

5. The filter assembly recited in claim 4, wherein the at least one tab and the at least one groove are configured such that advancement of the at least one tab within the at least one groove causes the housing to move axially along the collar axis.

6. The filter assembly recited in claim 1, further comprising a first seal coupled to the housing, the first seal being engageable with the manifold when the housing is engaged with the manifold to create a water-tight connection between the internal outlet and the filter inlet.

7. The filter assembly recited in claim 1, further comprising a second seal coupled to the housing, the second seal being engageable with the manifold when the housing is engaged with the manifold to create a water-tight connection between the filter outlet and the internal inlet.

8. The filter assembly recited in claim 1, wherein the internal inlet includes an annular portion extending around the internal outlet.

9. The filter assembly recited in claim 1, wherein the outlet axis is parallel to the inlet axis.

10. The filter assembly recited in claim 1, wherein at least a portion of the internal inlet extends concentrically about the internal outlet.

11. A manifold for use with a showerhead and an inlet conduit, the manifold comprising:
   a filter cartridge having a filter inlet and a filter outlet;
   an external inlet fluidly connectable to the inlet conduit and extending about an inlet axis defined by the inlet conduit;
   an internal outlet in fluid communication with the external inlet, the internal outlet being fluidly connectable with the filter inlet and extending about a collar axis which is angularly offset from and thus non-parallel to the inlet axis;
   an internal inlet fluidly connectable to the filter outlet and having at least a portion extending about the collar axis;
   a collar defining the collar axis and extending around the internal outlet and the internal inlet, the collar being sized such that at least a portion of the filter cartridge is receivable within the collar;
   wherein the collar includes a terminal edge extending around the collar axis and being non-parallel and non-perpendicular to the collar axis;
   an external outlet fluidly connectable to the showerhead; and
   an internal flowpath extending between the internal inlet and the external outlet.

12. The manifold recited in claim 11, wherein the collar includes an inner surface defining a cavity sized to receive at least a portion of the filter cartridge, the manifold further including at least one tab extending from the inner surface sized to interface with a corresponding groove on the filter cartridge to facilitate engagement with the filter cartridge.

13. The manifold recited in claim 11, wherein the internal inlet includes an annular portion extending around the internal outlet.

14. The manifold recited in claim 11, wherein the external outlet extends around an outlet axis which is non-parallel to the collar axis.

15. The manifold recited in claim 14, wherein the inlet axis is parallel to the outlet axis.

16. The manifold recited in claim 11, wherein the external inlet includes internal threads to facilitate engagement with the inlet conduit.

17. The manifold recited in claim 11, wherein the external outlet includes external threads to facilitate engagement with the showerhead.

18. A manifold for use with a showerhead, an inlet conduit which projects from a vertically oriented wall, the manifold comprising:
   a filter cartridge having a filter inlet and a filter outlet;
   an external inlet fluidly connectable to the inlet conduit and extending about an inlet axis defined by the inlet conduit;
   an external outlet fluidly connectable to the showerhead;
   a collar defining a collar axis which is angularly offset from and thus non- parallel to the inlet axis;
   an internal outlet in fluid communication with the external inlet and fluidly connectable with the filter inlet;
   an internal inlet fluidly connectable to the filter outlet and in fluid communication with the external outlet;
   at least portions of the internal outlet and the internal inlet being concentrically positioned within the collar and extending about the collar axis defined thereby, the collar being sized such that at least a portion of the filter cartridge is receivable within the collar, the collar further being oriented within the manifold such when the filter inlet is in fluid communication with the internal outlet and the external inlet is fluidly connected to the inlet conduit, the filter cartridge will extend along and about the collar axis which extends in generally parallel relation to the vertically oriented wall.

19. The manifold recited in claim 18, wherein the collar includes an inner surface defining a cavity sized to receive at least a portion of the filter cartridge, the manifold further including at least one tab extending from the inner surface sized to interface with a corresponding groove on the filter cartridge to facilitate engagement with the filter cartridge.

* * * * *